(12) United States Patent
Nagy

(10) Patent No.: US 10,076,832 B2
(45) Date of Patent: Sep. 18, 2018

(54) ACCESSORY SYSTEM FOR A POWER TOOL

(71) Applicants: Robert Bosch Tool Corporation, Broadview, IL (US); Robert Bosch GmbH, Stuttgart (DE)

(72) Inventor: Balazs Nagy, Schaumburg, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 72 days.

(21) Appl. No.: 15/221,498

(22) Filed: Jul. 27, 2016

(65) Prior Publication Data

US 2018/0029190 A1  Feb. 1, 2018

(51) Int. Cl.

| | |
|---|---|
| *B25F 3/00* | (2006.01) |
| *B27B 5/30* | (2006.01) |
| *B27B 19/00* | (2006.01) |
| *B23B 31/10* | (2006.01) |
| *B23B 31/19* | (2006.01) |
| *B24B 23/04* | (2006.01) |
| *B26B 7/00* | (2006.01) |
| *B27B 5/32* | (2006.01) |

(Continued)

(52) U.S. Cl.
CPC ............ *B25F 3/00* (2013.01); *B23B 31/10* (2013.01); *B23B 31/19* (2013.01); *B24B 23/04* (2013.01); *B26B 7/00* (2013.01); *B27B 5/30* (2013.01); *B27B 5/32* (2013.01); *B27B 19/006* (2013.01); *B23B 2231/04* (2013.01); *B23D 61/006* (2013.01); *B28D 1/183* (2013.01); *Y10T 279/33* (2015.01); *Y10T 279/3406* (2015.01)

(58) Field of Classification Search
CPC ..... B23B 31/10; B23B 31/19; B23B 2231/04; B24B 23/04; B24B 45/006; B25F 3/00; B27B 5/30; B27B 19/006; Y10T 279/33; Y10T 279/3406
See application file for complete search history.

(56) References Cited

U.S. PATENT DOCUMENTS 4,779,382 A * 10/1988 Rudolf ................. B24B 45/006
                                                        451/342
5,577,870 A * 11/1996 Nakamura ........... B24B 45/006
                                                        411/402
(Continued)

FOREIGN PATENT DOCUMENTS

EP         2085182 A1 *  8/2009  ............. B23Q 5/027

*Primary Examiner* — Eric A Gates
(74) *Attorney, Agent, or Firm* — Maginot Moore & Beck LLP

(57) ABSTRACT

An accessory holder for holding an accessory of a power tool includes a support frame and an actuator. The support frame includes a tool connection structure configured to connect to a driven output of the power tool and an accessory connection structure fixedly extending from the tool connection structure and defining at least one recess. The actuator is rotatably connected to the accessory connection structure and is rotatable to a clamped position and an unclamped position. The actuator is configured to deform a portion of the accessory into the at least one recess when the actuator is in the clamped position, such that the accessory is clamped to the accessory connection structure when the actuator is in the clamped position.

16 Claims, 10 Drawing Sheets

(51) Int. Cl.
*B23D 61/00* (2006.01)
*B28D 1/18* (2006.01)

(56) References Cited

U.S. PATENT DOCUMENTS

| | | | | |
|---|---|---|---|---|
| 6,857,948 | B2* | 2/2005 | Bocka | B24D 15/023 |
| | | | | 451/344 |
| 7,077,734 | B2* | 7/2006 | Tiede | B24B 23/04 |
| | | | | 451/357 |
| 8,029,341 | B2* | 10/2011 | Belly | B24B 13/01 |
| | | | | 451/259 |
| 8,727,838 | B2* | 5/2014 | Leung | B24B 23/005 |
| | | | | 451/344 |
| 9,399,278 | B2* | 7/2016 | Kuether | B24B 23/028 |
| 2010/0040474 | A1* | 2/2010 | Takahashi | B24B 45/006 |
| | | | | 416/219 R |
| 2014/0290072 | A1* | 10/2014 | Brown | B24B 23/04 |
| | | | | 30/272.1 |
| 2017/0340338 | A1* | 11/2017 | Hassler, Jr. | A61B 17/142 |

* cited by examiner

ACCESSORY SYSTEM FOR A POWER TOOL

FIELD

This patent relates generally to power tools and particularly to an accessory holder for clamping an accessory bit or tool to a driven output of a power tool.

BACKGROUND

Oscillating tools are handheld power tools used by professional craftsmen, handymen, and hobbyists. The typical oscillating tool is configured for use with a variety of accessory bits, tools, and blades that can be used for cutting, carving, drilling, sanding, polishing, and many other applications. One specific example of an oscillating tool is the Dremel® Multi-Max™ oscillating tool, which is sold by the Robert Bosch Tool Corporation.

The typical oscillating tool includes a housing that encloses an electric motor having a motor shaft. The motor shaft is coupled to a transmission, which converts rotation of the motor shaft into oscillating movement. A driven output extends from a front portion of the housing and is coupled to the transmission, such that the transmission oscillates the driven output when the motor is coupled to a supply of electrical energy.

The driven output is configured to receive an accessory bit, blade, or tool. The driven output, and any accessory bit connected thereto, oscillates through a range of movement of about two degrees (2°) to five degrees (5°) at a frequency of approximately 350 Hz when the motor is coupled to the supply of electrical energy. Typically, the oscillations cause a working portion of the accessory bit to move in a controlled side-to-side motion, which produces minimal dust during cutting operations.

The accessory bit typically includes a working portion permanently fastened to a connection portion. The working portion includes a sharpened edge or other feature that is applied to a workpiece. The connection portion has a particular shape that is suitable for connecting to the driven output. In order to efficiently transmit oscillations of the driven output to the working portion of the accessory bit, the connection portion must typically be manufactured according to low tolerances, so that the accessory bit is rigidly connected to the driven output. Moreover, it is typical for manufacturers to form the connection portion and the working portion separately, and then to weld or otherwise permanently bond the portions together. As a result, the manufacturing process for forming accessory bits suitable for use with an oscillating tool is typically laborious and expensive.

Therefore, it is desirable to reduce the costs associated with manufacturing accessory bits suitable for use with an oscillating power tool, while maintaining a rigid connection of the accessory bit to the driven output of the power tool.

SUMMARY

According to an exemplary embodiment of the disclosure, an accessory holder for holding an accessory of a power tool includes a support frame and an actuator. The support frame includes a tool connection structure configured to connect to a driven output of the power tool and an accessory connection structure fixedly extending from the tool connection structure and defining at least one recess. The actuator is rotatably connected to the accessory connection structure and is rotatable to a clamped position and an unclamped position. The actuator is configured to deform a portion of the accessory into the at least one recess when the actuator is in the clamped position, such that the accessory is clamped to the accessory connection structure when the actuator is in the clamped position.

According to another exemplary embodiment of the disclosure, an accessory system for use with a power tool having a driven output, the accessory system includes an accessory and an accessory holder. The accessory includes at least one connection prong defining a thickness. The accessory holder includes a support frame and at least one cam member. The support frame has (i) a tool connection structure configured to connect to the driven output, and (ii) an accessory connection structure fixedly extending from the tool connection structure and defining an accessory plane in which the at least one connection prong is positioned and at least one recess located on an opposite side of the accessory plane from the at least one connection prong. The at least one cam member is operably connected to the support frame and rotatable to a clamped position and an unclamped position. The at least one cam member is spaced apart from the accessory plane by a first distance greater than the thickness when the at least one cam member is in the unclamped position. The at least one cam member is spaced apart from the accessory plane by a second distance less than the thickness when the at least one cam member is in the clamped position, such that the at least one cam member deforms a portion of the at least one connection prong into the at least one recess when the at least one cam member is in the clamped position.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
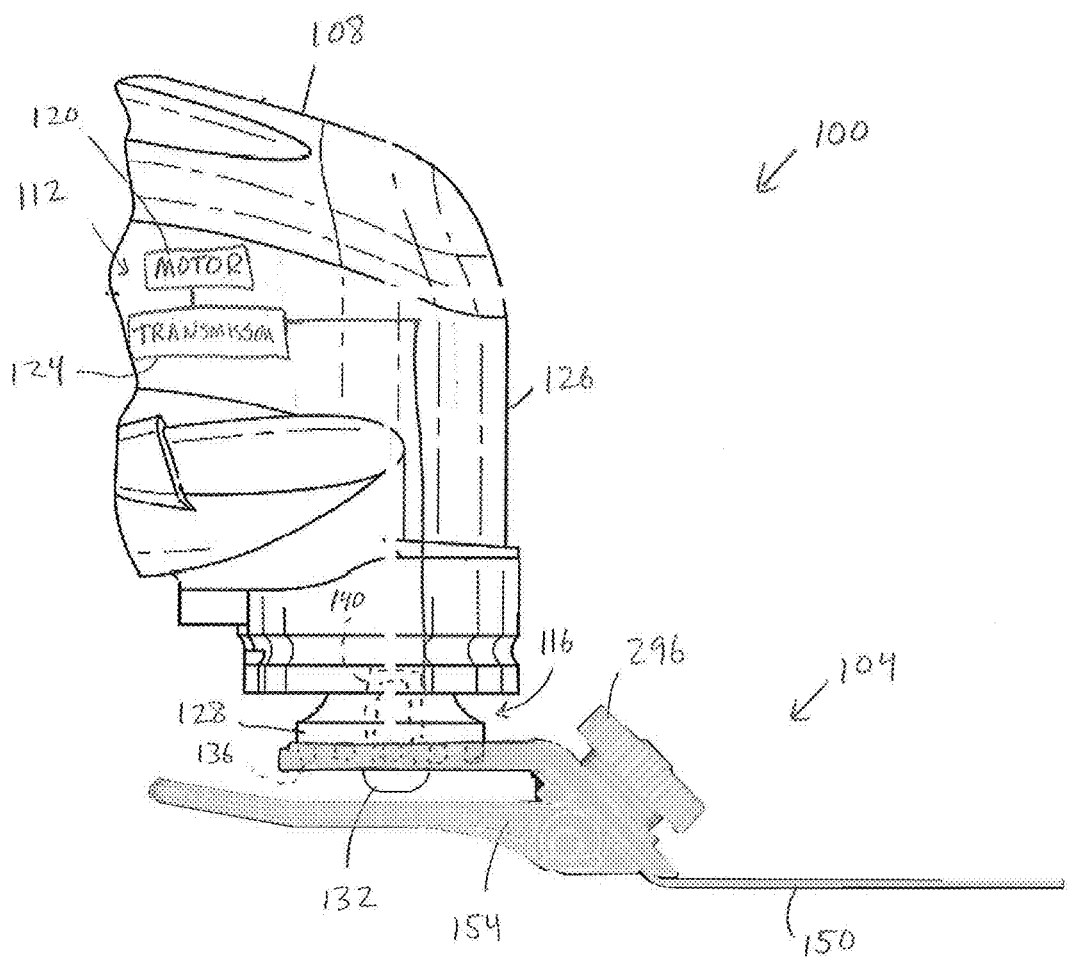
FIG. 1 is a side elevational view of a tool system including a power tool and an accessory system connected to the power tool.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

As shown in FIG. 1, a tool system 100 includes an accessory system 104 configured for use with a power tool 108. The power tool 108, in this exemplary embodiment, is an oscillating power tool and includes a drive system 112 operably connected to a driven output 116. The drive system 112 includes an electric motor 120 and a transmission 124 located within a housing 126 of the power tool 108. The transmission 124 is configured to convert rotation of a motor shaft (not shown) of the electric motor 120 into oscillatory movement of the driven output 116.

The driven output 116, in one embodiment, includes a flange 128 and a fastening member 132. The flange 128 is substantially circular and includes a plurality of prongs 136. The flange 128 defines a connection opening 140 configured to threadingly receive the fastening member 132. The flange 128 is configured to connect either a suitable accessory (not shown) or the accessory system 104 to the driven output 116 for oscillation by the electric motor 120. In another embodiment, the power tool 108 may include a quick-change driven output (not shown) that is operated with a lever (not shown) pivotably supported by the housing 126 or any other type of driven output 116, as desired by those of ordinary skill in the art.

Figure 2:
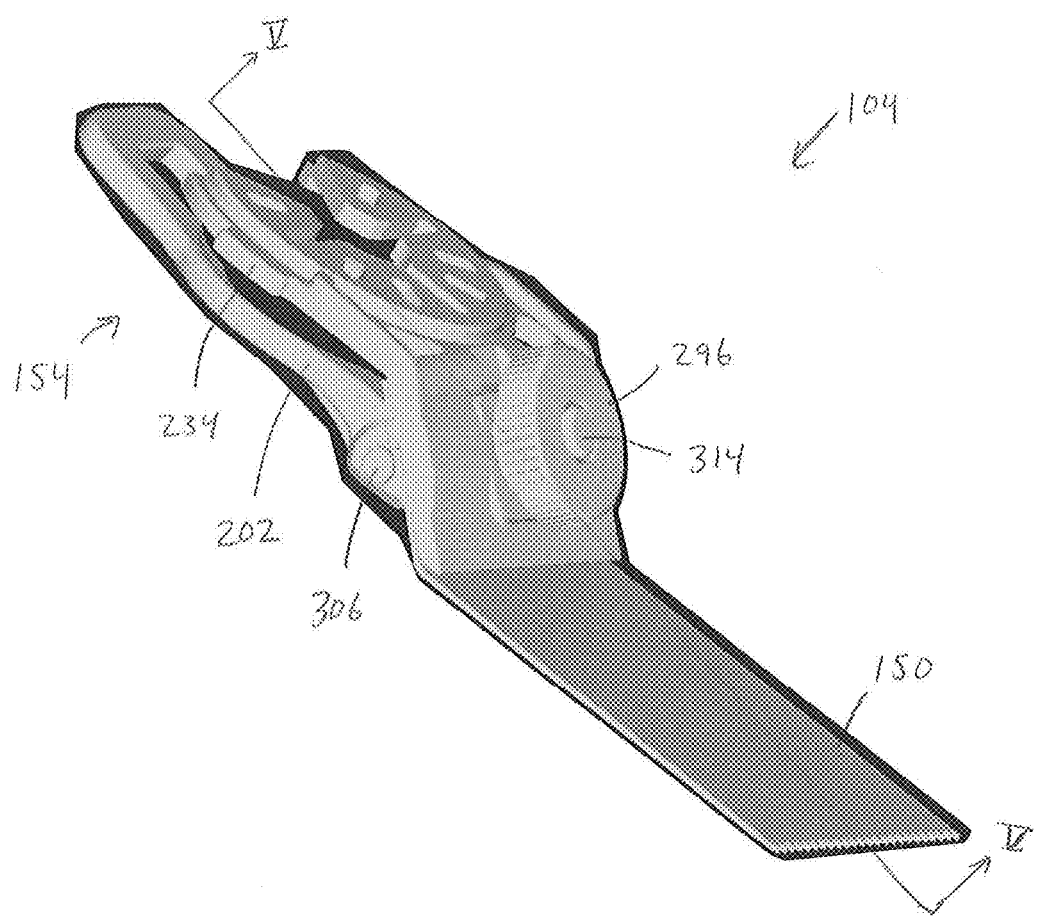
FIG. 2 is a perspective view of the accessory system of FIG. 1 shown disconnected from the power tool, the accessory system includes an accessory holder and an accessory.
Figure 3:
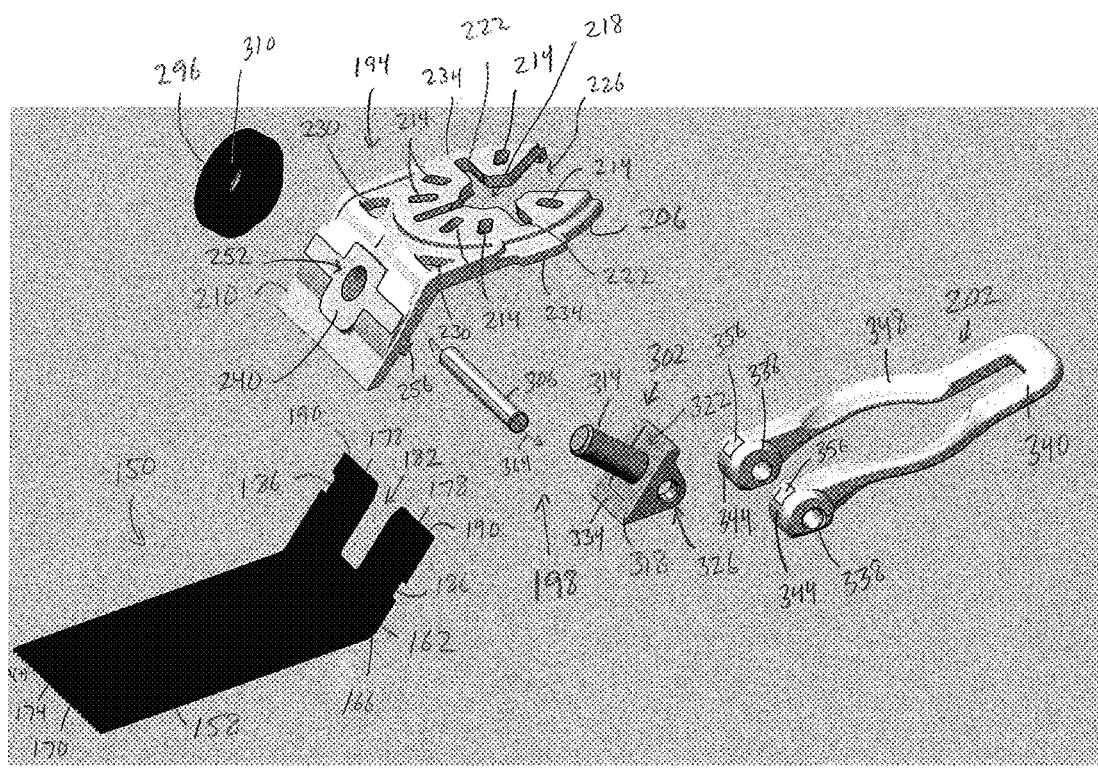
FIG. 3 is an exploded perspective view of the accessory system of FIG. 1.
Figure 4:
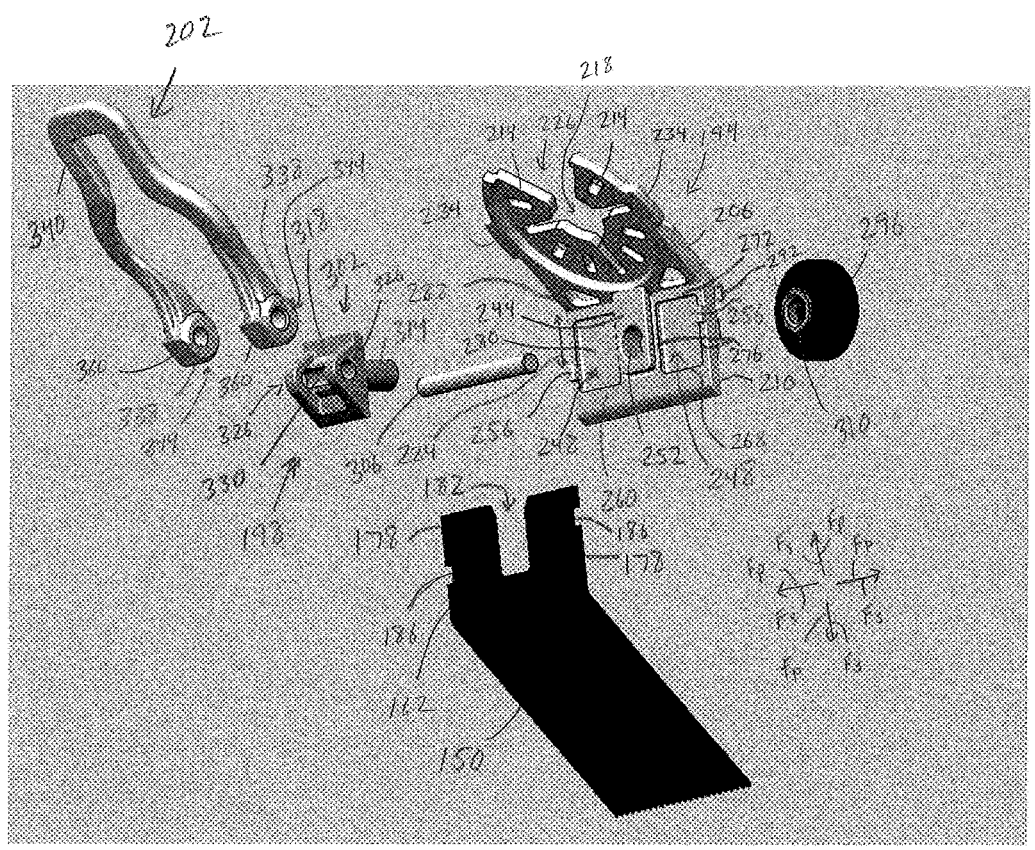
FIG. 4 is another exploded perspective view of the accessory system of FIG. 1.

As shown in FIGS. 2-4, the accessory system 104 includes an accessory 150 and an accessory holder 154. With particular reference to FIG. 3, the accessory 150 includes a working portion 158 and a connection portion 162. In one embodiment, the working portion 158 and the connection portion 162 are formed from a single blank and a bend 166 in the accessory 150 forms a boundary between the working portion 158 and the connection portion 162. Thus, the accessory 150 is typically inexpensive to manufacture, because no welding or other affixing process is needed to connect the working portion 158 to the connection portion 162. Instead, working portion 158 and the connection portion 162 are a single monolithic part.

In FIG. 3, the working portion 158 defines a cutting edge 170 with a plurality of cutting teeth 174. In another embodiment, the working portion 158 may include any other type of tool edge, such as a knife, a file, a rasp, a sanding implement, a grout cutter, and the like.

The connection portion 162 of the accessory 150 includes two connection prongs 178 spaced apart from each other by a prong space 182. Each connection prong 178 defines a detent 186 configured to receive a corresponding protrusion 256 of the accessory holder 154. The detents 186 are spaced apart from a rear edge 190 of the accessory 150 by different distances in order to key the accessory 150 to the accessory holder 154 and to enable the accessory 150 to be connected to the accessory holder 154 in only a correct orientation (i.e. poka-yoke solution). In other embodiment, the accessory 150 includes a different configuration of the detents 186, such that the accessory 150 is connectable to the accessory holder 154 in multiple orientations, as may be desired by the user. In a further embodiment, the accessory 150 does not include the detents 186.

As shown in FIGS. 3 and 4, the accessory holder 154 includes a support frame 194, an adjustment assembly 198, and an actuator 202. The support frame 194 includes a tool connection structure 206 extending from an accessory connection structure 210. The tool connection structure 206 is configured to connect to the driven output 116 of the power tool 108 in order to connect the accessory holder 154 to the power tool 108. The tool connection structure 206 defines a plurality of prong openings 214, a center opening 218, extension channels 222, a passage space 226, and front openings 230. Each prong opening 214 is configured to receive a prong 136 extending from the flange 128. The center opening 218 is configured pass a portion of the fastening member 132 therethrough. Depending on the make and model of the power tool 108, some of the extension channels 222 may be filled with a correspondingly shaped structure extending from the flange 128. The passage space 226 is fluidly connected to the center opening 218 and configures the tool connection structure 206 to be connected to the flange 128 without completely separating the fastening member 132 from the connection opening 140.

The tool connection structure 206 further includes a plurality of tabs 234. Each tab 234 extends from the tool connection structure 206 and is configured to strengthen the tool connection structure 206 near the extension channels 222. The tabs 234 also provide the user with a gripping point to manipulate the actuator 202 when the accessory holder 154 is disconnected from the power tool 108.

With continued reference to FIGS. 3 and 4, the accessory connection structure 210 fixedly extends from the tool connection structure 206 and includes a contact surface 240, a support bar 244, a first and a second recess 248, a shaft opening 252, and a plurality of protrusions 256. The contact surface 240, as shown in FIG. 3, is a flat surface configured to contact a portion of the adjustment assembly 198. The support bar 244, as shown in FIG. 4, is located opposite from the contact surface 240 and is located between the recesses 248. The shaft opening 252 is a substantially circular opening through the support bar 244. The shaft opening 252 is typically unthreaded.

The recesses 248 have a substantially rounded rectangle perimeter and extend only partially through a thickness of the accessory connection structure 210. As identified in FIG. 5, a rear surface 260 of the accessory connection structure 210 located opposite from the contact surface 240 defines an accessory plane 264 in which the connections prongs 178 of the accessory 150 are positioned. The recesses 248 are inset from the rear surface 260 of the accessory connection structure 210, such that the recesses 248 extend below the accessory plane 264. The recesses 248 are located on an opposite side of the accessory plane 264 from the connection prongs 178.

Figure 5:
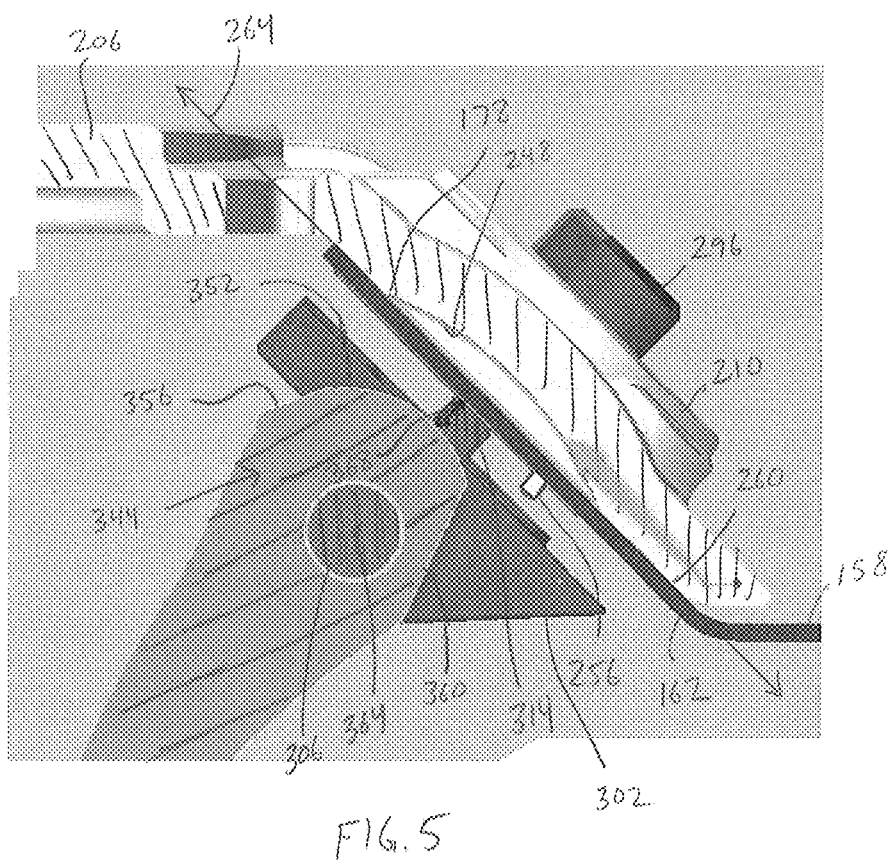
FIG. 5 is a cross sectional view taken along line V-V of FIG. 2, showing an actuator of the accessory holder in an unclamped position and an adjustment assembly of the accessory holder in a loosened position.

As shown in FIG. 4, the recesses 248 are further defined by a front edge 268, an opposite rear edge 272, side edges 276, and a recess bottom 280. The recesses 248 define a depth extending from the rear surface 260 to the recess bottom 280. The recesses 248 also define a length extending from the front edge 268 to the rear edge 272, and a width extending from the side edges 276. In the illustrated embodiment, the recesses 248 are substantially identical; however, in other embodiments the recesses 248 may be shaped differently from one another. As shown in FIG. 5, in at least one embodiment, the recess bottom 280 is curved.

The protrusions 256 extend from the rear surface 260 of the accessory connection structure 210 away from the recesses 248. The protrusion 256 shown to the left in FIG. 4 is located a first distance 284 from an intersection 288 of the tool connection structure 206 and the accessory connection structure 210, and the protrusion 256 shown to the right in FIG. 4 is located a second distance 292 from the intersection 288. The distance 292 is less than the distance 284, and the distances 284, 292 correspond to the configuration of the detents 186 in the accessory 150. In particular, the protrusions 256 are configured to extend through the detents 186 when the connection portion 162 of the accessory 150 is positioned against the rear surface 260 in the accessory plane 264. As described above, the different distances 284, 292 configure the accessory connection structure 210 and the accessory 150 as a poka-yoke solution that prevents the user from applying the accessory 150 to the accessory connection structure 210 in an incorrect orientation. In other embodiments of the accessory connection structure 210, the protrusions 256 are not included, and the accessory 150 is connectable to the accessory connection structure 210 in more than one orientation.

With reference again to FIGS. 3 and 4, the adjustment assembly 198 includes a knob 296, a yoke 302, and a pin 306. The knob 296 defines a threaded opening 310 and includes a knurled or otherwise textured exterior surface that is configured to provide the user with grip when the user rotates the knob 296. The knob 296 is configured to be rotated without hitting the power tool 108 even when the accessory system 104 is connected to the power tool 108. In other embodiments, the knob 296 has any other suitable shape or configuration for being rotated by hand or with a tool such as a wrench.

The yoke 302 includes a threaded shaft 314 extending from a base 318. The threaded shaft 314 is substantially cylindrical and is configured to fit though the shaft opening 252 of the accessory connection structure 210. The threaded shaft 314 is also configured to be received by the threaded opening 310 in the knob 296. The threaded shaft 314 is shown in threaded engagement with the knob 296 in FIG. 2 and is shown spaced apart from the knob in FIGS. 3 and 4. When the knob 296 is threadingly engaged with the threaded shaft 314, the accessory connection structure 210 is located between the knob 296 and the yoke 302.

The base 318 of the yoke 302 defines a support bar recess 322 (FIG. 3), two yoke openings 326, and a curved pin support 330 (FIG. 4). The support bar recess 322 is configured to receive the support bar 244 therein, when a yoke surface 334 is positioned against or near the rear surface 260. When the support bar 244 is located at least partially within the support bar recess 322, rotation of the yoke 302 relative to the support bar 244 is prevented. Accordingly, the knob 296 is easily rotated relative to the yoke 302 when the support bar 244 is located at least partially within the support bar recess 322.

The yoke openings 326 are configured to receive the pin 306 therethrough. The curved pin support 330 substantially matches an exterior contour of the pin 306. The pin 306 is configured to extend though the yoke openings 326.

Figure 6:
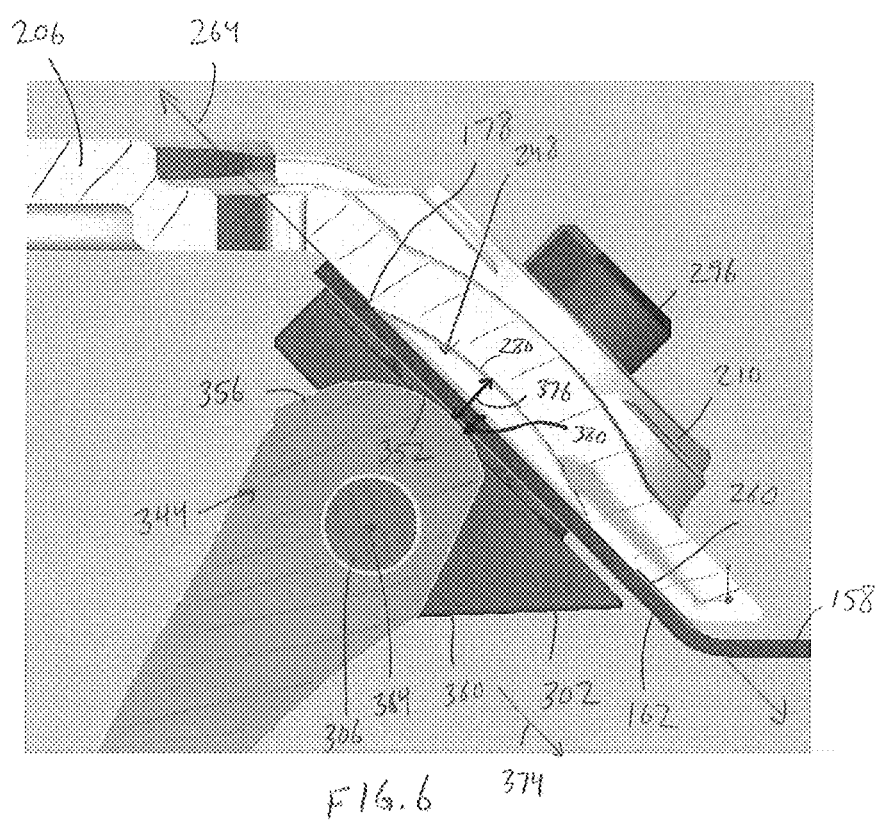
FIG. 6 is a cross sectional view taken along line V-V of FIG. 2, showing the actuator in the unclamped position and the adjustment assembly in a tightened position.

As shown in FIGS. 3 and 4, the actuator 202 is rotatably connected to the accessory connection structure 210, and, as described herein, is configured to deform the accessory 150. The actuator 202 defines pin openings 338 configured to receive the pin 306 in order to operably connect the actuator 202 to the yoke 302. The actuator 202 is configured to rotate relative to the accessory connection structure 210 about the pin 306 to a clamped position (FIGS. 1, 2, and 7) and an unclamped position (FIGS. 5 and 6). The actuator 202 is rotatable to the clamped and unclamped positions when tool connection structure 206 is connected to the driven output 116 of the power tool 108, and also when the tool connection structure 206 is disconnected from the power tool 108. Accordingly, the power tool 108 does not prevent or limit the actuator 202 from rotating to the clamped and unclamped positions.

The actuator 202 includes a handle 340 extending from two cam members 344. The handle 340 is generally "U"-shaped and one of the cam members 344 terminates each end of the handle 340. The handle 340 includes a cutout portion 348 that is configured to prevent the actuator 202 from contacting the power tool 108 when the accessory holder 154 is connected to the power tool 108 and the actuator 202 is in the clamped position.

As shown in FIG. 5, the cam members 344 define a cam surface 352, a stop protrusion 356, and a flat surface 360. The cam surface 352 is curved and is an eccentric in relation to a rotational axis 364 defined by rotation of the actuator 202 about the pin 306. That is, a left side (11 o'clock as shown in FIG. 5) of the cam surface 352 is located further from the axis 364 than a right side (2 o'clock as shown in FIG. 5) of the cam surface 352.

Each stop protrusion 356 extends from a respective cam surface 352 and is a portion of the respective cam surface 352. In one embodiment, the stop protrusion 356 has a substantially flat profile. In another embodiment, the stop protrusion 356 has a curved profile that is substantially the same as a curvature imparted in the accessory 150 when the actuator 202 is in the clamped position. The stop protrusion 356 is configured to generate audible or tactile feedback when the actuator 202 is moved to the clamped position against the accessory 150. The typical user can feel and hear the transition from the cam surface 352 being pressed against the accessory 150 to the stop protrusion 356 being pressed against the accessory 150.

Each flat surface 360 extends from a corresponding cam surface 352, and the cam surface 352 is located between the stop protrusion 356 and the flat surface 360. The flat surface 360 terminates the cam surface 352 and is configured to enable easy removal and installation of the accessory 150 from the accessory holder 154. The flat surface 360 makes removal and installation of the accessory 150 easier when the actuator 202 is positioned so that the flat surface 360 is substantially parallel to the rear surface 260 and a large gap exists between the flat surface 360 and the rear surface 260 in which the user can easily move the accessory 150.

In operation, the accessory holder 154 securely holds the accessory 150 during usage of the power tool 108. Specifically, the accessory holder 154 bends and/or deforms the connection prongs 178 of the accessory 150 into the recesses 248 to prevent movement of the accessory 150 relative to the accessory holder 154 even when the working portion 158 of the accessory 150 is forced against a workpiece (not shown). To use the accessory system 104, according to one example, the user connects the accessory holder 154, without the accessory 150, to the power tool 108. To make the connection, the user loosens the fastening member 132 from the connection opening 140, but does not fully remove the fastening member 132. Next, the user moves the accessory holder 154 toward the flange 128 with the fastening member 132 passing through the passage space 226. Then, the user moves the accessory holder 154 toward the flange 128 to insert the prongs 136 through the prong openings 214. To secure the accessory holder 154 to the power tool 108, the user tightens the fastening member 132, with a tool or other suitable means (not shown), against the tool connection structure 206. The user can connect the accessory holder 154 to the power tool 108 with the actuator 202 in the clamped or unclamped positions. Additionally or alternatively, the user can connect the accessory holder 154 to the power tool 108 with an accessory 150 already connected to the accessory holder 154.

Next, an accessory 150 is connected to the accessory holder 154. Initially, the user moves the actuator 202 to the unclamped position, as shown in FIG. 5. Next, the user slides the connection portion 162 of the accessory 150 between the cam surfaces 352 and the rear surface 260 until the protrusions 256 line up with the detents 186, at which point the user presses the accessory 150 against the rear surface 260. At this point in the process, the support bar 244 is located in the prong space 182 between the two connection prongs 178, and the connection portion 162 is located in the accessory plane 264, and the protrusions 256 are located in the detents 186. Since, the actuator 202 is in the unclamped position the connection prongs 178 do not extend into the recesses 248.

Thereafter, the user adjusts the adjustment assembly 198 to position the actuator 202 for properly securing the accessory 150. The adjustment assembly 198 adjusts the extent to which the cam members 344 deform the connection prongs 178 when the actuator 202 is in the clamped position. The adjustment assembly 198, therefore, adjusts how much clamping force is applied to the accessory 150 and how much force is required to move the actuator 202 to the clamped position. As shown in FIG. 5, the actuator 150 is in an unadjusted position (also referred to herein as a loosened position). The "adjusting" of the adjustment assembly 198 refers to closing the distance 368 (FIG. 6) between the cam surfaces 352 and the connection prongs 178 to configure the adjustment assembly 198 in the adjusted position (also referred to herein as a tightened position). To adjust the adjustment assembly 198, the user rotates the knob 296 in a tightening direction until the cam surfaces 352 contact the connection prongs 178. When the user rotates the knob 296, the yoke 302 and the actuator 202 are moved towards or away from the rear surface 260 depending on the direction of knob 296 rotation. When the knob 296 is loosened, the yoke 302 and the cam surfaces 352 move away from the rear surface 260 as the threaded shaft 314 is forced from the threaded opening 310 and the distance 368 increases. When the knob 296 is tightened, the yoke 302 and the cam surfaces 352 move toward the rear surfaces 260 as the threaded shaft 314 is pulled into the threaded opening 310 and the distance 368 decreases. Typically, it is unnecessary to tighten the knob 296 with a tool. Instead, hand tightening the knob 296 until the cam surfaces 352 contact the connection prongs 178 is sufficient. The knob 296 is adjusted until the distance 368 is closed (i.e. reduced to zero or substantially zero). Stated differently, the knob 296 is adjusted to space the cam surfaces 352 apart from the rear surface 260 and the accessory plane 264 by a distance substantially equal to or equal to the thickness 372 (FIG. 7) of the connection prongs 178. In FIG. 6, the distance 368 is reduced to zero and the cam surfaces 352 are spaced apart from the rear surface 260 by the thickness 372. Also, during adjustment of the adjustment assembly 198, the yoke 302 receives the support bar 244 in the support bar recess 322 to prevent rotation of the yoke 302 and the cam surfaces 352 relative to the recesses 248. In another embodiment, the "adjusting" of the adjustment assembly 198 refers to reducing a distance 376 (FIG. 6) between the cam surfaces 352 and the recess bottom 280 to position the cam surfaces 352 against the connection prongs 178.

Figure 7:
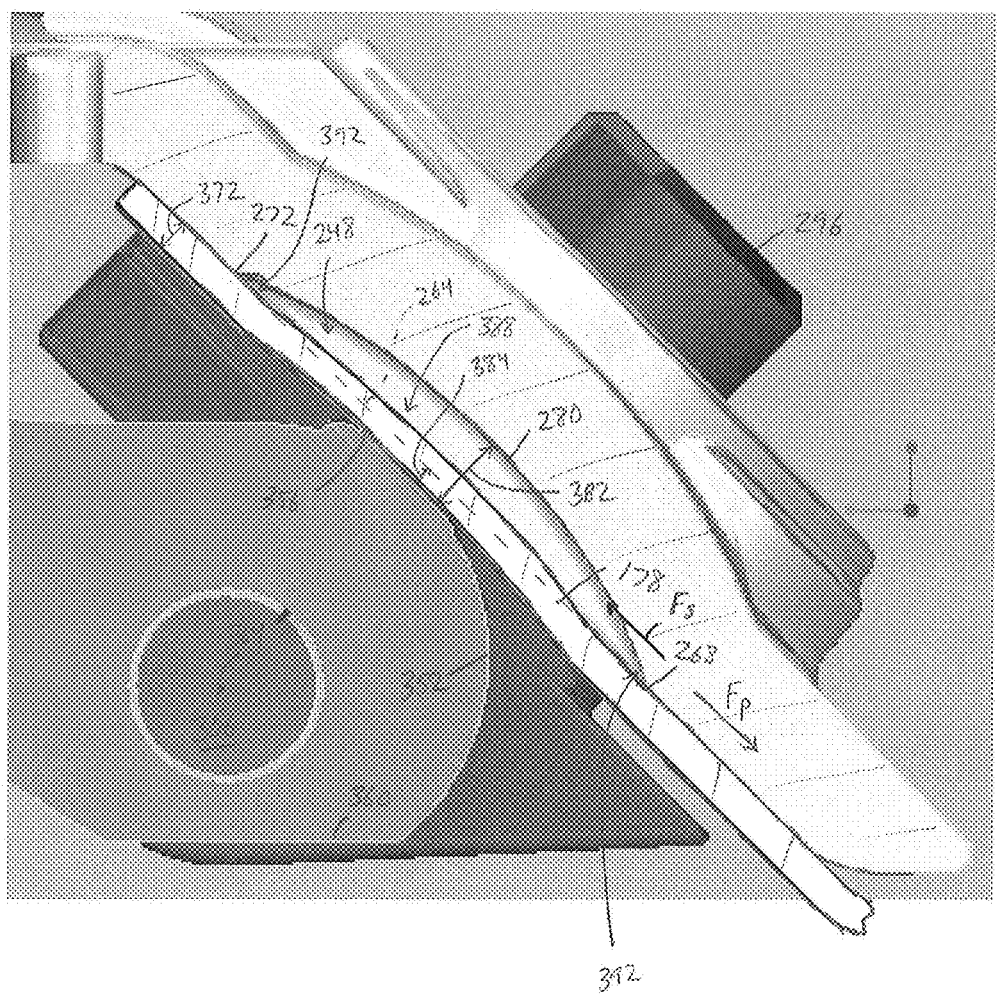
FIG. 7 is a cross sectional view taken along line V-V of FIG. 2, showing the actuator in a clamped position in which the accessory holder has deformed a portion of the accessory into a recess of the accessory holder to securely connect the accessory to the accessory holder.
Figure 8:
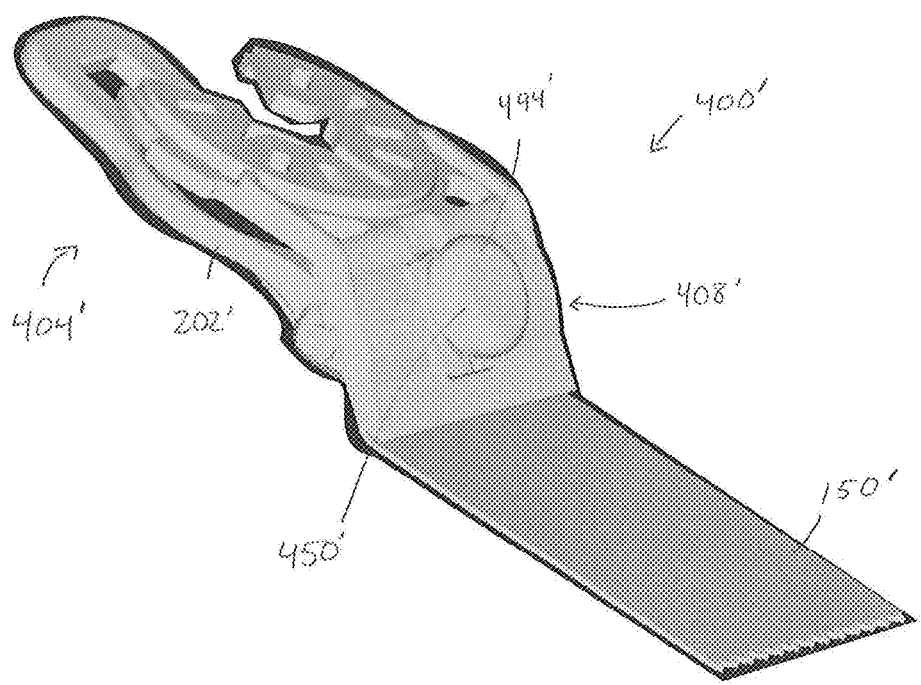
FIG. 8 is perspective view of another embodiment of an accessory system configured for connection to the power tool of FIG. 1, the accessory system including an accessory holder and an accessory.

After the cam surfaces 352 have been adjusted against the connection prongs 178, as shown in FIG. 6, the user rotates the actuator 202 to the clamped position as shown in FIG. 7. The protrusions 256, which are located in the detents 186, prevent the rotational movement of the cam members 344 from pushing the connection prongs 178 in the direction 374 (FIG. 6) away from the tool connection structure 206. Thus, the protrusions 256 hold the accessory 150 in position on the rear surface 260 during pivoting of the actuator 202.

The cam surfaces 352 of the actuator 202 are configured to deform and/or to bend the connection prongs 178 of the accessory 150 into the recesses 248 when the actuator 202 is moved to the clamped position, such that the accessory 150 is clamped to the accessory connection structure 210 when the actuator 202 is in the clamped position. The mechanical advantage provided by the cam members 344 and the handle 340 make the process of moving the actuator 202 to the clamped position and bending the connection prongs 178 easy for all users. To further describe this process, certain reference distances are defined. A first unclamped distance 376 (FIG. 6) is defined between the cam surfaces 352 and the recess bottom 280 when the actuator 202 is in the unclamped position, and a second unclamped distance 380 is defined between the cam surfaces 352 and the accessory plane 264 when the actuator 202 is in the unclamped position. A first clamped distance 382 (FIG. 7) is defined between the cam surfaces 352 (i.e. the stop protrusions 356) and the recess bottom 280 of the recesses 248 when the actuator 202 is in the clamped position, and a second clamped distance 384 is defined between the cam surfaces 352 and the accessory plane 264 when the actuator 202 is in the clamped position. The first unclamped distance 376 is greater than the first clamped distance 382. Similarly, the second unclamped distance 380 is greater than the second clamped distance 384. The second clamped distance 384 is less than the thickness 372 of the connection prongs 178.

The various distances defined above are described to show that the cam members 344, in the clamped position, push a portion of the connection prongs 178 located between the edge 268 and the edge 272 into the recess 248 to form a bend 388 (FIG. 7) in the connection prongs 178. The bend 388 (i.e. the bent portion of the connection prong 178) is located on a first and a second side of the accessory plane 264. In at least some embodiments, the cam members 344 form another bend in the connection prongs 178 that extends from the edges 276.

The bend 388 in the connection prongs 178 strongly secures the accessory 150 to the accessory holder 154. In the past, accessories were connected to a power tool with a clamp that applied only a normal force to a flat accessory. The past clamps did not deform or bend the accessory. The past clamps relied on frictional forces between the clamp and the accessory to resist pulling and pushing forces applied to the accessory. These frictional forces are typically reduced by impurities or lubricants on the clamp or the accessory, and when the clamp begins to wear and make an uneven contact with the accessory. Thus, the pulling and pushing forces typically overcome the frictional forces generated by past accessory clamps. In the present accessory system 104, the bend 388 in the connection prongs 178 results in the creation of sheer areas 392 that generate a sheer force $F_S$ (FIG. 7) in response to pulling and pushing forces $F_P$ (FIG. 7) against the accessory 150. Sheer areas 392 are formed between the bend 388 and the edge 268, the bend 388 and the edge 272, and the bend 388 and the edges 276. The sheer areas 392 are areas of interference between the connection prongs 178 and the accessory connection structure 210. The bend 388 generates a corresponding sheer force $F_S$ (FIG. 4) in response to a pulling or pushing force $F_P$ (FIG. 4) in any direction. The sheer forces $F_S$ better resist the pulling and pushing forces $F_P$ as compared to frictional forces, because the sheer forces $F_S$ are based on (i) the resistance to deformation of the connection prong 178 and the accessory connection structure 210, and (ii) the interference fit between the bent connection prong 178 and the accessory connection structure 210. That is, the connection prongs 178 are configured to be bent and deformed, but the connection prongs 178 are resistant to being crushed (i.e. a force that would reduce the thickness 372). The resistance to crushing makes the sheer force $F_S$ generated by the interference between the connection prongs 178 and the accessory connection structure 210 very strong. The accessory holder 154 also generates some frictional forces between the connection prongs 178, the yoke 302, and the accessory connection structure 210 that further resist the pulling and pushing forces $F_P$.

The accessory 150 is typically easier and less expensive to manufacture than known accessories for oscillating power tools, such as the power tool 108. The accessory 150 is formed as a single part and does not require welding or other connection steps. Thus, the accessory 150 is securely held in place and is easy and inexpensive to manufacture.

Figure 10:
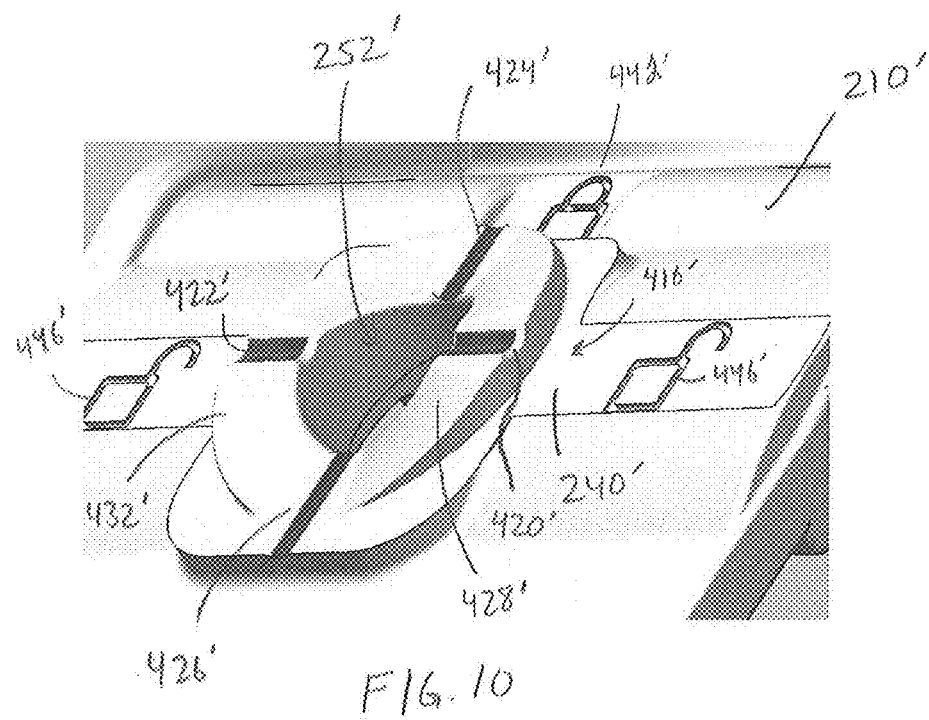
FIG. 10 is a perspective view of a portion of the accessory holder of FIG. 8 showing ramps and detents formed in the accessory holder.
Figure 11:
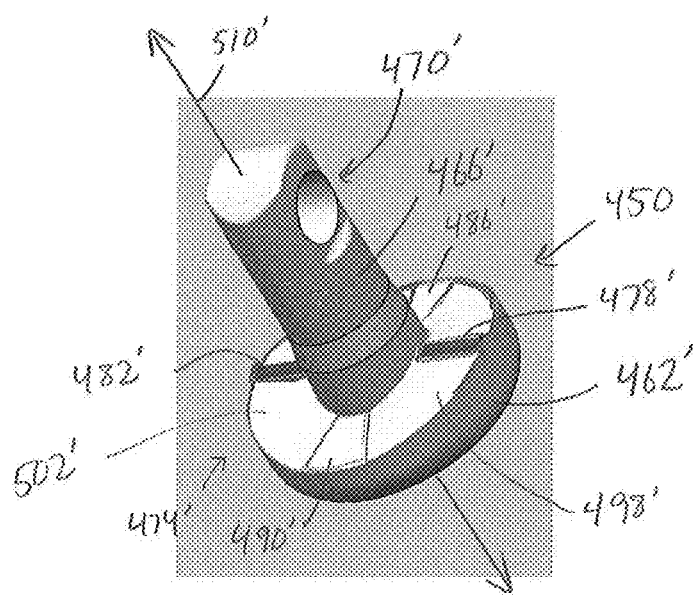
FIG. 11 is a perspective view of a clamping bolt of the accessory holder of FIG. 8 including corresponding ramps and protrusions configured to interact with the ramps and detents shown in FIG. 10.
Figure 12:
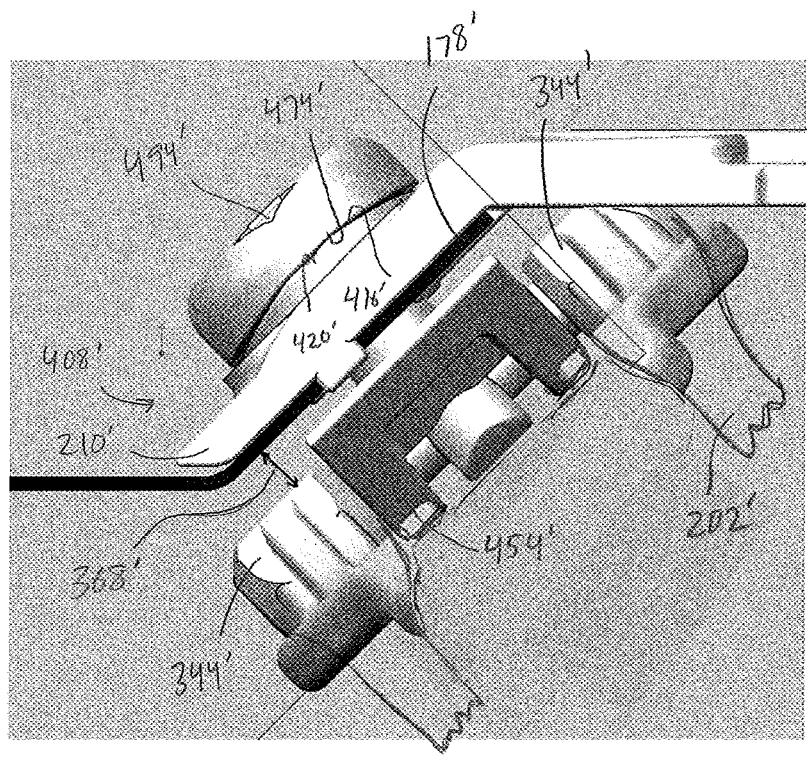
FIG. 12 is a side elevational view showing the accessory system of FIG. 8 in an unadjusted configuration.
Figure 13:
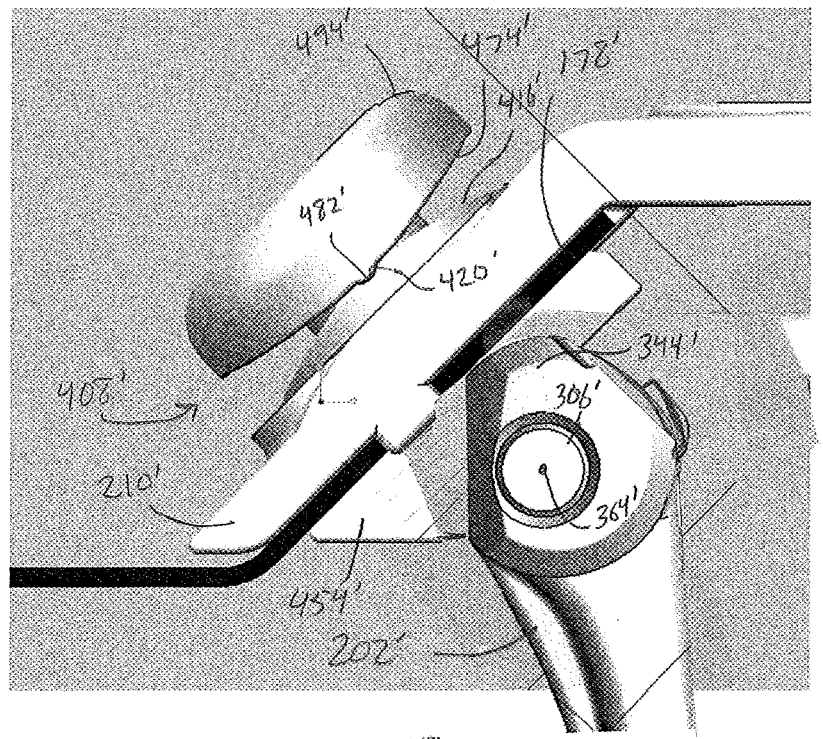
FIG. 13 is another side elevational view showing the accessory system of FIG. 8 in an adjusted configuration.

As shown in FIGS. 8-13, another embodiment of an accessory system 400' includes an accessory holder 404' and an accessory 150'. The parts and features of the accessory holder 404' that are identical to the accessory holder 154 are identified with like reference numerals that are terminated with a prime symbol (') in FIGS. 8-13. The accessory holder 404' includes an adjustment assembly 408' that is different from the adjustment assembly 198. In particular, instead of including the knob 296 for the user to adjust manually the distance 368 between the cam members 344 and the connection prongs 178, the adjustment assembly 408' automatically closes the distance 368' (FIG. 12) in response to a ninety degree rotation of the actuator 202' and the adjustment assembly 408', as shown in FIGS. 12 and 13.

Figure 9:
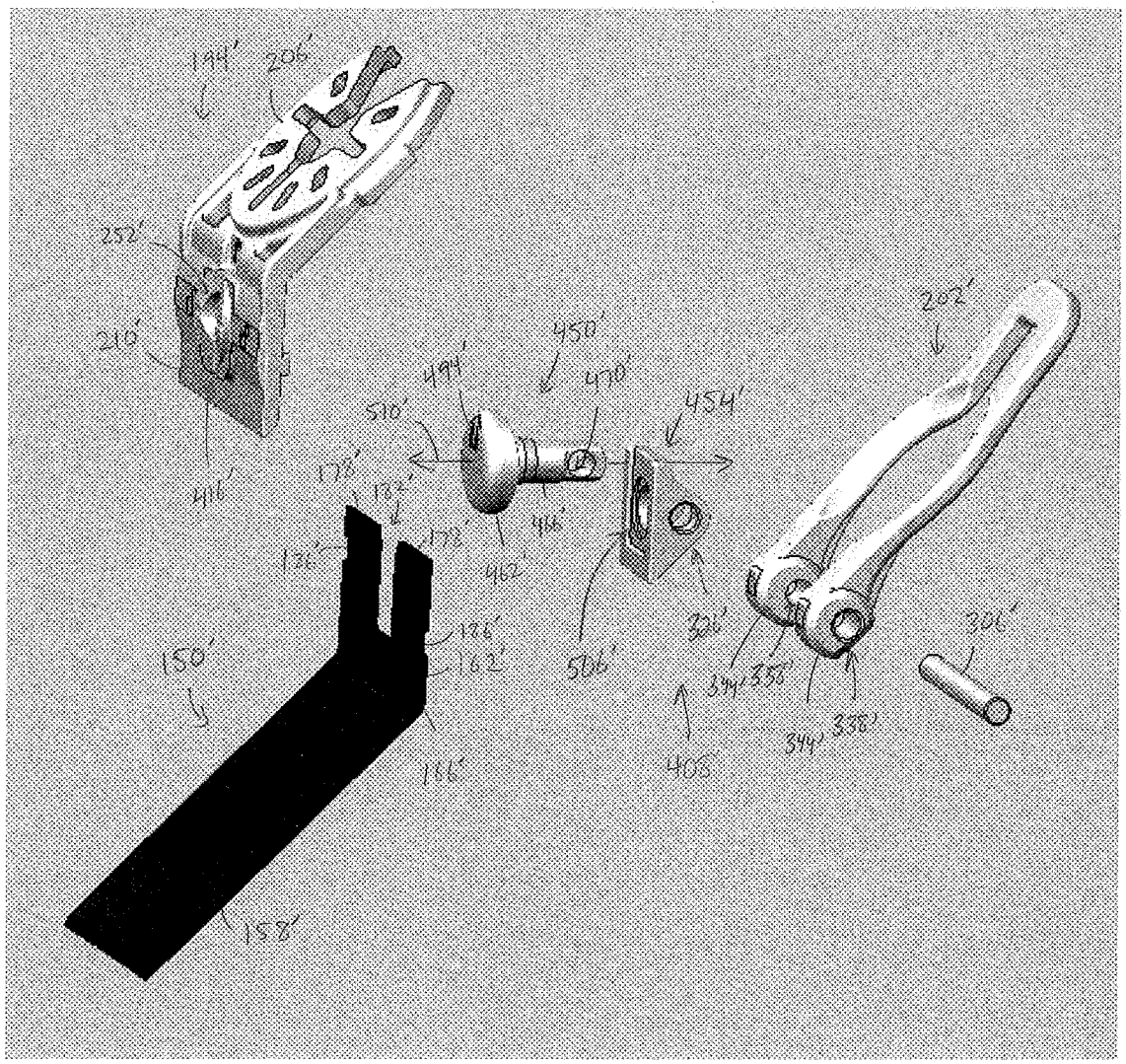
FIG. 9 is an exploded perspective view of the accessory system of FIG. 8.

In FIGS. 9-11, the accessory holder 404' includes a support frame 194' including a tool connection structure 206' and an accessory connection structure 210'. The accessory connection structure 210' includes a ramp structure 416' surrounding at least a portion of the shaft opening 252', two unlock detents 420', 422', and two lock detents 424', 426'. The ramp structure 416' defines a first ramp 428' and an opposite second ramp 432'. The first ramp 428' extends from the first lock detent 424' to the second lock detent 426' and has a high point (also referred to herein as an apex) at the first unlock detent 420'. The first ramp 428' rises from the first lock detent 424' to the first unlock detent 420' and falls from the first unlock detent 420' to the second lock detent 426'. The second ramp 432' is configured similarly, but on the other side of the shaft opening 252'. The second ramp 432' has a high point or an apex at the second unlock detent 422'. The second ramp 432' rises from the first lock detent 424' to the second unlock detent 422' and falls from the second unlocked detent 422' to the second locked detent 426'. The accessory connection structure 210' includes a lock indicium 442' to identify the position of the first lock detent 424', and two unlock indicia 446' to identify the position of the unlock detents 420', 422'.

The adjustment assembly 408' includes a clamping bolt 450', a yoke 454', and a pin 306'. As shown in FIG. 11, the clamping bolt 450' includes a head 462' and a clamp shaft 466' extending from the head 462' and defining a pin opening 470'. The head 462' defines another ramp structure 474', a first protrusion 478', a second protrusion 482', a first flat 486', a second flat 490', and an arrow indicium 494' (FIG. 9). The ramp structure 474' surrounds the clamp shaft 466' and has substantially the same configuration as the ramp structure 416'. The ramp structure 474' defines a first ramp 498' and a second ramp 502', which are both located adjacent to the head 462'. The first ramp 498' rises from the first flat 486' to a high point (also referred to herein as an apex) at the first protrusion 478'. The high point of the first ramp 498' is closer to the pin opening 470' than the first flat 486'. The first ramp 498' falls away from the pin opening 470' from the first protrusion 478' to the second flat 490'. The second ramp 502' rises from the first flat 486' to a high point or an apex at the second protrusion 482'. The high point of the second ramp 502' is the same distance from the pin opening 470' as the high point of the first ramp 498'. The second ramp 502' falls away from the pin opening 470' from the second protrusion 482' to the second flat 490'.

The protrusions 478', 482' of the head 462' are configured to be received within the detents 420', 422', 424', 426' of the ramp structure 416' depending on the rotational position of the actuator 202'.

The arrow indium 494' is configured to point to one of the unlock indicia 446' and the lock indicium 442' to indicate if the adjustment assembly 408' is in the unlocked position or the locked position respectively.

With reference to FIG. 9, the yoke 302' is operably connected to the clamp shaft 466'. In particular, the yoke 302' defines a shaft opening 506' through which the clamp shaft 466' is configured to extend. The clamp shaft 466' extends through the shaft opening 506' and the shaft opening 252' to position the ramp structure 416' against the ramp structure 474', such that the accessory connection structure 210' is located between the head 462' and the yoke 454'.

The pin 306' extends through the pin openings 338' of the actuator 202', the yoke openings 326' of the yoke 454', and the pin opening 470' of the clamp shaft 466'. With the pin 306' inserted through the openings 326', 338', 470', the actuator 202', the yoke 454', and the clamp bolt 450' are rotatable as a unit relative to the accessory connection structure 210' about a longitudinal axis 510' defined by the clamp shaft 466'. Rotation of the actuator 202', results in rotation of the ramp structure 416' relative to the ramp structure 474'.

In operation, and with reference to FIGS. 12 and 13, the adjustment assembly 408' is rotatable about the longitudinal axis 510' to an unlocked position (FIG. 12) and a locked position (FIG. 13). As described, below, rotation of the adjustment assembly 408' automatically moves the cam members 344' against the connection prongs 178' of the accessory 150' by closing the distance 368'. The actuator 202' is rotated only ninety degrees (90°) to close the distance 368'. As shown in FIG. 12, the adjustment assembly 408' is in the unlocked position in which the arrow indicium 494' points to one of the unlock indicia 446'. In the unlocked position, the cam members 344' are spaced apart from the connection prongs 178' by the distance 368' to enable the accessory 150' to be removed or installed on the accessory connection structure 210'.

The rotational position of the head 462' relative to the ramp structure 416 positions the cam members 344' the distance 368' apart from the connection prongs 178'. In particular, in the unlocked position of the adjustment assembly 408', the protrusions 478', 482' of the ramp structure 474' are aligned with the lock detents 424', 426' of the ramp structure 416', such that the ramp structures 416', 474' fit together in a compact configuration.

To close the distance 368' the user rotates the actuator 202', the pin 306', the yoke 454', and the clamp bolt 450' ninety degrees to the locked position shown in FIG. 13. The rotation causes the protrusions 478', 482' to ride on the ramps 428', 432' and to settle in the detents 420', 422', such that the ramp structures 416', 474' fit together in an extended configuration that positions the cam members 344' against the connection prongs 178' and closes the distances 368'. The user is provided with audible and tactile feedback when the protrusions 478', 482' settle in the detents 420', 422'. With the adjustment assembly 408' in the locked position, the user rotates the actuator 202' about the axis 364' to bend the connection prongs 178' and to lock the accessory 150' to the accessory holder 404' in same manner as described above in connection with the accessory holder 154'.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An accessory holder for holding an accessory of a power tool comprising:
    a support frame including a tool connection structure configured to connect to a driven output of the power tool and an accessory connection structure fixedly extending from said tool connection structure and defining at least one recess; and
    an actuator rotatably connected to said accessory connection structure and rotatable about a rotational axis to a clamped position and an unclamped position, said actuator configured to deform a portion of the accessory into said at least one recess away from said rotational axis when said actuator is in said clamped position, such that the accessory is clamped to said accessory connection structure when said actuator is in said clamped position.

2. The accessory holder of claim 1, further comprising:
    a cam member of said actuator,
    wherein a first distance is defined between said cam member and a bottom surface of said at least one recess when said actuator is in said unclamped position,
    wherein a second distance is defined between said cam member and said bottom surface of said at least one recess when said actuator is in said clamped position, and
    wherein said second distance is less than said first distance.

3. The accessory holder of claim 2, further comprising:
    a stop protrusion extending from said cam member and configured to generate audible or tactile feedback when said actuator is moved to said clamped position against the accessory.

4. The accessory holder of claim 2, further comprising:
    an adjustment assembly configured to adjust a length of said first distance.

5. The accessory holder of claim 4, wherein the adjustment assembly includes:
    a yoke, a shaft extending from said yoke, and a knob,
    wherein said actuator is operably connected to said yoke,
    wherein said shaft extends through a shaft opening defined by said accessory connection structure,
    wherein said knob is threadingly engaged with said shaft, such that said accessory connection structure is located between said knob and said yoke.

6. The accessory holder of claim 1, wherein:
    said at least one recess is defined by a first edge of said accessory connection structure and an opposite second edge of said accessory connection structure,
    said actuator is forced against the accessory between said first edge and said opposite second edge and is configured to bend the accessory at least partially into said at least one recess, and
    the accessory does not extend into said at least one recess when said actuator is in said unclamped position.

7. The accessory holder of claim 1, wherein said actuator is movable to said clamped position and said unclamped position when said tool connection structure is connected to the driven output.

8. The accessory holder of claim 1, further comprising:
    a yoke to which said actuator is operably connected,
    a shaft extending from said yoke through a shaft opening defined by said accessory connection structure,
    a knob threadingly engaged with said shaft, such that said accessory connection structure is located between said knob and said yoke.

9. The accessory holder of claim 8, wherein:
    said at least one recess includes a first recess and a second recess, and
    said shaft opening is located between said first recess and said second recess.

10. The accessory holder of claim 1, further comprising:
    an adjustment assembly including (i) a clamping bolt including a head and a clamp shaft extending from the head, and (ii) a yoke operably connected to said clamp shaft, such that said accessory connection structure is located between said head and said yoke, wherein said accessory connection structure defines at least one first ramped surface located adjacent to said head, wherein said head defines at least one second ramped surface configured for movement relative to said at least one first ramped surface, wherein said actuator is operably connected to said yoke, wherein said actuator and said adjustment assembly are rotatable about a longitudinal axis defined by said clamp shaft to a first position that causes said at least one first ramped surface and said at least one second ramped surface to space said actuator a first distance from said at least one recess, and wherein said actuator and said adjustment assembly are rotatable about said longitudinal axis to a second position that causes said at least one first ramped surface and said at least one second ramped surface to space said actuator a second distance from said at least one recess, and wherein said second distance less than said first distance.

11. The accessory holder of claim 10, wherein:

said accessory connection structure includes at least one detent located at an apex of said at least one first ramped surface, said head includes at least one protrusion located at an apex of said at least one second ramped surface, said at least one protrusion is configured to be received by said at least one detent when said adjustment assembly is in said second position.

12. An accessory system for use with a power tool having a driven output, the accessory system comprising:

an accessory including at least one connection prong defining a thickness; and an accessory holder including a support frame having (i) a tool connection structure configured to connect to the driven output, and (ii) an accessory connection structure fixedly extending from said tool connection structure and defining an accessory plane in which said at least one connection prong is positioned and at least one recess located on an opposite side of said accessory plane from said at least one connection prong, and at least one cam member operably connected to said support frame and rotatable about a rotational axis to a clamped position and an unclamped position, said rotational axis extending parallel to said accessory plane, said at least one cam member spaced apart from said accessory plane by a first distance greater than said thickness when said at least one cam member is in said unclamped position and said at least one cam member spaced apart from said accessory plane by a second distance less than said thickness when said at least one cam member is in said clamped position, such that said at least one cam member deforms a portion of said at least one connection prong into said at least one recess when said at least one cam member is in said clamped position.

13. The accessory system of claim 12, further comprising:

a first protrusion extending from said accessory connection structure and located a third distance from an intersection of said tool connection structure and said accessory connection structure;

a second protrusion extending from said accessory connection structure and located a fourth distance from said intersection of said tool connection structure and said accessory connection structure, a first detent defined by said accessory and configured to receive said first protrusion when said accessory is positioned in said accessory plane; and a second detent defined by said accessory and configured to receive said second protrusion when said accessory is positioned in said accessory plane, wherein said third distance is greater than said fourth distance.

14. The accessory system of claim 12, wherein:

said at least one connection prong includes a first connection prong and a second connection prong spaced apart from each other by a prong space, said at least one recess includes a first recess and a second recess, said at least one cam member includes a first cam member and a second cam member, said first cam member is configured to deform a portion of said first connection prong into said first recess when said first cam member is in said clamped position, and said second cam member is configured to deform a portion of said second connection prong into said second recess when said second cam member is in said clamped position.

15. An accessory system for use with a power tool having a driven output, the accessory system comprising:

an accessory including at least one connection prong defining a thickness;

an accessory holder including a support frame having (i) a tool connection structure configured to connect to the driven output, and (ii) an accessory connection structure fixedly extending from said tool connection structure and defining an accessory plane in which said at least one connection prong is positioned and at least one recess located on an opposite side of said accessory plane from said at least one connection prong, and at least one cam member operably connected to said support frame and rotatable to a clamped position and an unclamped position, said at least one cam member spaced apart from said accessory plane by a first distance greater than said thickness when said at least one cam member is in said unclamped position and said at least one cam member spaced apart from said accessory plane by a second distance less than said thickness when said at least one cam member is in said clamped position, such that said at least one cam member deforms a portion of said at least one connection prong into said at least one recess when said at least one cam member is in said clamped position; and an adjustment assembly configured to adjust a length of said first distance and a length of said second distance.

16. The accessory system of claim 15, wherein the adjustment assembly includes:

a yoke, a shaft extending from said yoke, and a knob, wherein said actuator is operably connected to said yoke, wherein said shaft extends through a shaft opening defined by said accessory connection structure, wherein said knob is threadingly engaged with said shaft, such that said accessory connection structure is located between said knob and said yoke.

* * * * *